US011442634B2

(12) United States Patent
Jean et al.

(10) Patent No.: US 11,442,634 B2
(45) Date of Patent: Sep. 13, 2022

(54) REPLAY PROTECTED MEMORY BLOCK COMMAND QUEUE

(71) Applicant: Micron Technology, Inc., Boise, ID (US)

(72) Inventors: Sebastien Andre Jean, Meridian, ID (US); Greg A. Blodgett, Marsing, ID (US)

(73) Assignee: Micron Technology, Inc., Boise, ID (US)

( * ) Notice: Subject to any disclaimer, the term of this patent is extended or adjusted under 35 U.S.C. 154(b) by 322 days.

(21) Appl. No.: 16/485,374

(22) PCT Filed: Apr. 11, 2019

(86) PCT No.: PCT/US2019/027043
§ 371 (c)(1),
(2) Date: Aug. 12, 2019

(87) PCT Pub. No.: WO2019/200142
PCT Pub. Date: Oct. 17, 2019

(65) Prior Publication Data
US 2021/0334016 A1    Oct. 28, 2021

Related U.S. Application Data

(60) Provisional application No. 62/680,405, filed on Jun. 4, 2018, provisional application No. 62/656,884, filed on Apr. 12, 2018.

(51) Int. Cl.
G06F 12/00    (2006.01)
G06F 13/00    (2006.01)
(Continued)

(52) U.S. Cl.
CPC .......... *G06F 3/0622* (2013.01); *G06F 3/0659* (2013.01); *G06F 3/0679* (2013.01); *G06F 21/602* (2013.01); *G06F 21/79* (2013.01)

(58) Field of Classification Search
CPC .... G06F 3/0622; G06F 3/0659; G06F 3/0679; G06F 21/602; G06F 21/79
(Continued)

(56) References Cited

U.S. PATENT DOCUMENTS 5,191,649 A  * 3/1993 Cadambi ............. G06F 15/17
709/225
6,557,079 B1 * 4/2003 Mason, Jr. .......... G06F 12/0862
711/113
(Continued)

FOREIGN PATENT DOCUMENTS

CN    112154408    12/2020
WO    2019200142    10/2012

OTHER PUBLICATIONS

"International Application Serial No. PCT US2019 027043, International Search Report dated Aug. 2, 2019", 3 pgs.
(Continued)

*Primary Examiner* — Sheng Jen Tsai
(74) *Attorney, Agent, or Firm* — Schwegman Lundberg & Woessner, P.A.

(57) ABSTRACT

Devices and techniques are disclosed herein for providing an improved Replay Protected Memory Block (RPMB) data frame and command queue for communication between a host device and a memory device.

26 Claims, 6 Drawing Sheets

(51) Int. Cl.
  *G06F 3/06* (2006.01)
  *G06F 21/60* (2013.01)
  *G06F 21/79* (2013.01)
(58) Field of Classification Search
  USPC .......................................................... 711/163
  See application file for complete search history.

(56) References Cited

U.S. PATENT DOCUMENTS

| | | | | |
|---|---|---|---|---|
| 6,591,321 | B1* | 7/2003 | Arimilli | G06F 12/0831 710/100 |
| 7,107,384 | B1* | 9/2006 | Chen | G06F 12/0862 382/305 |
| 8,572,320 | B1* | 10/2013 | Maheshwari | G06F 13/1673 711/119 |
| 9,098,203 | B1* | 8/2015 | Kedem | G06F 13/26 |
| 9,218,891 | B2 | 12/2015 | Wu et al. | |
| 9,329,992 | B2 | 5/2016 | Wu et al. | |
| 10,418,115 | B2 | 9/2019 | Blodgett et al. | |
| 11,088,845 | B2* | 8/2021 | Sela | G06F 12/1466 |
| 2003/0061459 | A1* | 3/2003 | Aboulenein | G06F 12/0215 711/167 |
| 2004/0123078 | A1* | 6/2004 | Hum | G06F 9/30087 712/217 |
| 2006/0277437 | A1* | 12/2006 | Ohtsuka | G06T 1/20 714/33 |
| 2006/0282233 | A1* | 12/2006 | Pasricha | G06F 30/33 703/1 |
| 2007/0273699 | A1* | 11/2007 | Sasaki | G06F 9/3879 345/502 |
| 2008/0046695 | A1* | 2/2008 | Ishizuka | G06F 13/1642 712/214 |
| 2011/0022746 | A1* | 1/2011 | Chang | G06F 21/606 710/52 |
| 2012/0047516 | A1* | 2/2012 | Barwick | G06F 9/461 718/108 |
| 2013/0031306 | A1* | 1/2013 | Kim | G06F 12/0862 711/113 |
| 2013/0205068 | A1* | 8/2013 | Kettner | G06F 12/0246 711/103 |
| 2014/0068218 | A1* | 3/2014 | Iemura | G06F 3/0674 711/167 |
| 2015/0134857 | A1* | 5/2015 | Hahn | G06F 3/061 710/5 |
| 2015/0146486 | A1* | 5/2015 | Wu | G11C 16/3459 365/185.04 |
| 2015/0154110 | A1* | 6/2015 | Wu | G06F 11/079 714/37 |
| 2015/0331638 | A1* | 11/2015 | Zaltsman | G06F 3/0679 710/308 |
| 2016/0188501 | A1* | 6/2016 | Chan | G06F 13/1673 710/113 |
| 2016/0239446 | A1* | 8/2016 | Su | H01L 23/49838 |
| 2016/0342365 | A1* | 11/2016 | Nosaka | G06F 3/0625 |
| 2017/0031824 | A1* | 2/2017 | Choi | G06F 12/0862 |
| 2017/0185538 | A1* | 6/2017 | Khan | G06F 21/86 |
| 2018/0314626 | A1* | 11/2018 | Kuo | G06F 12/0246 |
| 2019/0013079 | A1* | 1/2019 | Blodgett | G06F 1/3275 |
| 2019/0163913 | A1* | 5/2019 | Sun | G06F 12/1408 |
| 2019/0196716 | A1* | 6/2019 | Xiao | G06F 3/064 |
| 2019/0236031 | A1* | 8/2019 | Kim | G06F 12/14 |
| 2019/0258581 | A1* | 8/2019 | Lee | G06F 3/0619 |
| 2019/0266096 | A1* | 8/2019 | Lee | G06F 12/0875 |
| 2019/0286586 | A1* | 9/2019 | Minopoli | G06F 3/0659 |
| 2020/0014544 | A1* | 1/2020 | Sela | H04L 9/0891 |
| 2020/0210106 | A1* | 7/2020 | Cariello | G06F 3/0659 |
| 2020/0210596 | A1* | 7/2020 | Cariello | H04L 9/0866 |
| 2020/0211662 | A1* | 7/2020 | Cariello | G06F 3/0604 |
| 2020/0304238 | A1* | 9/2020 | Xiao | G06F 3/0673 |
| 2021/0117249 | A1* | 4/2021 | Doshi | G06F 9/522 |

OTHER PUBLICATIONS

"International Application Serial No. PCT US2019 027043, Written Opinion dated Aug. 2, 2019", 5 pgs.
"JEDEC Standard", JEDEC Solid State Technology Association, JEDEC Standard No. 84-A441, URL: http: yourcmc.ru wiki images 5 55 EMMC_JESD84-A441.pdf, (Mar. 31, 2010), 231.
Einav, Zilberstein, "e.MMC Security Methods", A detailed overview of the different security methods one can use in an e.MMC storage device, https: documents.westerndigital.com content dam doc-library en_us assets publicwestern-digital collateral white-paper white-paper-emmc-security.pdf, (Mar. 31, 2017), 12.
"International Application Serial No. PCT US2019 027043, International Preliminary Report on Patentability dated Oct. 22, 2020", 7 pgs.

* cited by examiner

REPLAY PROTECTED MEMORY BLOCK COMMAND QUEUE

PRIORITY APPLICATIONS

This application is a U.S. National Stage Application under 35 U.S.C. 371 from International Application No. PCT/US2019/027043, filed Apr. 11, 2019, which claims the benefit of priority to U.S. Provisional Application Ser. No. 62/680,405, filed Jun. 4, 2018 and the benefit of priority to U.S. Provisional Application Ser. No. 62/656,884, filed Apr. 12, 2018, all of which are incorporated herein by reference in their entireties.

BACKGROUND

Memory devices are typically provided as internal, semiconductor, integrated circuits in computers or other electronic devices. There are many different types of memory including volatile and non-volatile memory. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems (e.g., a host device) typically include a host processor, a first amount of host memory (e.g., main memory, often volatile memory, such as DRAM) to support the host processor, and one or more storage systems (e.g., often non-volatile memory, such as flash memory) that provide additional storage to retain data in addition to or separate from the main memory.

A storage system (e.g., a solid-state drive (SSD), a universal flash storage (UFS) device, etc.) can include control circuitry (e.g., a memory controller) and one or more memory devices, including a number of (e.g., multiple) dies or logical units (LUNs). In certain examples, each die can include a number of memory arrays and peripheral circuitry thereon, such as die logic or a die processor. The control circuitry can include interface circuitry configured to communicate with a host device (e.g., the host processor or interface circuitry) through a communication interface (e.g., a bidirectional parallel or serial communication interface). The control circuitry can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Storage systems are utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different forms of volatile memory, such as a group of static memory (e.g., a cache, often SRAM), often faster than the main memory, in certain examples, configured to operate at speeds close to or exceeding the speed of the host processor, but with lower density and higher cost. Memory devices may also include static memory (e.g., SRAM) to support the memory controller or control circuitry.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The Joint Electron Device Engineering Council (JEDEC) has promulgated numerous interface and communication standards for Universal Flash Storage (UFS) devices, embedded MultiMediaCard (eMMC™) devices, or one or more other storage devices. A Replay Protected Memory Block (RPMB) allows a portion of memory to be accessed with a hidden security key, providing secure storage for the host device to protect crucial programs or data, as well as enable copy protection. RPMB can provide a secure way to exchange information and avoid man-in-the-middle attacks, in certain examples, providing an in-kernel application programming interface (API) for trusted execution environment (TEE) devices to securely compute block frame signatures or access protected information.

Writes to an RPMB portion of memory can be authenticated using a key/mac (message authentication code), such as a HMAC SHA-256 algorithm calculated from a security key (e.g., programmed into a host device or a memory device) and a counter value that is incremented each time the RPMB portion of memory is written. The counter and use of the key/mac ensures that messages cannot be captured by an attacker and then later replayed (as the key/mac will not match due to the change in the counter).

Figure 1:
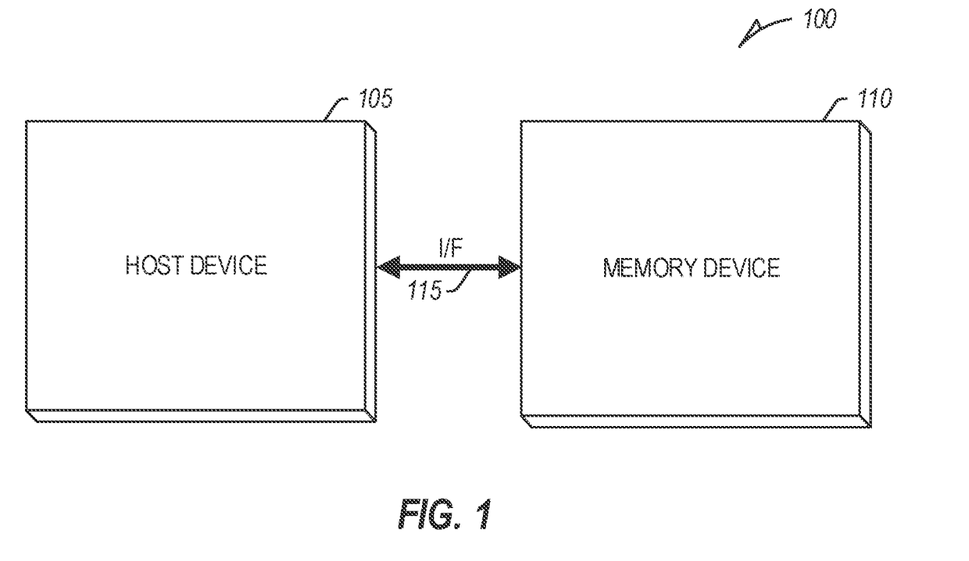
FIGS. 1-2 illustrate an example system including a host device and a memory device.

FIG. 1 illustrates an example system 100 including a host device 105 and a memory device 110. The host device 105 can include a host processor, a central processing unit, or one or more other device, processor, or controller. The memory device 110 can include a universal flash storage (UFS) device, an embedded MMC (eMMC) device, or one or more other memory devices. The host device 105 and the memory device 110 can communicate using a communication interface (I/F) 115 (e.g., a bidirectional parallel or serial communication interface).

In an example, the memory device 110 can include a UFS device, and the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, the memory device 110 can include an eMMC device, and the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the memory device 110 can include one or more other memory devices, or the communication interface 115 can include one or more other interfaces, depending on the host device 105 and the memory device 110.

Each of the host device 105 and the memory device 110 can include a number of receiver or driver circuits configured to send or receive signals over the communication interface 115, or interface circuits, such as data control units, sampling circuits, or other intermedia circuits configured to process data to be communicated over, or otherwise process data received from the communication interface 115 for use by the host device 105, the memory device 110, or one or more other circuits or devices.

The memory device 110 can include a memory array (e.g., one or more arrays of memory cells, such as a NAND flash memory array, or one or more other memory arrays), control circuitry, such as a memory controller, and in certain examples, an interface circuit between the memory array and the memory controller. In certain examples, the memory array can include a number of memory die, each having control logic separate from the memory controller. The memory controller can include an application specific integrated circuit (ASIC), a field programmable gate array (FPGA), or one or more other processing circuits arranged or programmed to manage data transfers or operations to, from, or within the memory array. Further, the memory device 110 can include a group of static memory (e.g., SRAM) configured to support the control circuitry.

Figure 2:
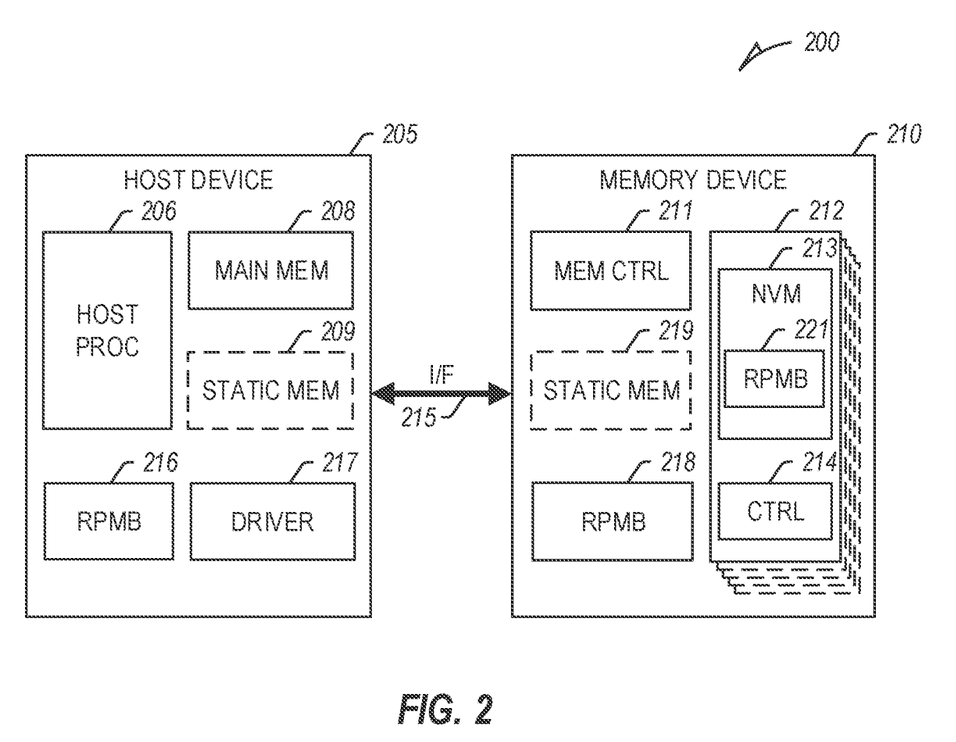

FIG. 2 illustrates an example portion of a system 200 including a host device 205, a memory device 210, and a communication interface (I/F) 215. The memory device 210 can include a non-volatile memory (NVM) device 212 and control circuitry, such as a memory controller (MEM CTRL) 211 or circuits or control logic, and can provide data from the NVM device 212 to the host device 205, or receive data from the host device 205 to be stored on the NVM device 212, using the communication interface 215.

The memory controller 211 can optionally include a limited amount of static memory 219 to support operations of the memory controller 211. In an example, the NVM device 212 can include a number of non-volatile memory devices (e.g., dies or LUNs), such as one or more stacked flash memory devices (e.g., as illustrated with the stacked dashes underneath the NVM device 212), etc., each including non-volatile memory (NVM) 213 (e.g., one or more groups of non-volatile memory cells) and a device controller (CTRL) 214 or other periphery circuitry thereon (e.g., device logic, etc.), and controlled by the memory controller 211 over an internal storage-system communication interface (e.g., an Open NAND Flash Interface (ONFI) bus, etc.) separate from the communication interface 215. Control circuitry, as used herein, can refer to one or more of the memory controller 211, the device controller 214, or other periphery circuitry in the memory device 210, the NVM device 212, etc.

The host device 205 can include a host processor 206 (e.g., a host central processing unit (CPU) or other processor or processing circuitry, such as a memory management unit (MMU), interface circuitry, etc.). In certain examples, the host device 205 can include a main memory (MAIN MEM) 208 (e.g., DRAM, etc.) and optionally, a static memory (STATIC MEM) 209, to support operation of the host processor (HOST PROC) 206.

The host device 205 can include a host Replay Protected Memory Block (RPMB) circuit 216 (or other logic or crypto cell) configured to adapt host data (e.g., encrypt) for communication to the memory device 210, or to receive RPMB data from the memory device 210, such as through a driver circuit 217 or other buffer, etc. The memory device 210 can include a memory device Replay Protected Memory Block (RPMB) circuit 218 (or other logic or crypto cell) configured to receive the adapted host data, such as through one or more buffer, etc., from the communication interface 215, and check such request for access to a protected partition of the NVM device 212, such as an RPMB partition 221 separate from a user partition or other portion of the NVM 213. If a valid command is confirmed, the memory device RPMB circuit 218 can enable communication of RPMB data between the host device 205 and the RPMB partition 221. In an example, the memory device RPMB circuit 218 and the host RPMB circuit 216 can include RPMB access logic, including an authentication key circuit (e.g., one-time password (OTP)), a write counter, or one or more other circuits or logic.

Flash memory devices typically include one or more groups of one-transistor, floating gate (FG) or replacement gate (RG) memory cells. Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, HRAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

The memory device 210 can include a multimedia card (MMC) solid-state storage device (e.g., micro secure digital (SD) cards, etc.). MMC devices include a number of parallel interfaces (e.g., an 8-bit parallel interface) with a host device 205, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces between the storage system and a host device. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate (FG) or replacement gate (RG) (or charge trapping) storage structures can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 211 can receive instructions from the host device 205, and can communicate with the NVM device 212, such as to transfer data to (e.g., write or erase) or from (e.g., read) one or more of the memory cells of the NVM device 212. The memory controller 211 can include, among other things, circuitry or firmware, such as a number of components or integrated circuits. For example, the memory controller 211 can include one or more memory control units, circuits, or components configured to control access across the memory array and to provide a translation layer between the host device 205 and the storage system 200, such as a memory manager, one or more memory management tables, etc.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager can parse or format host commands (e.g., commands received from the host device 205) into device commands (e.g., commands associated with operation of a memory array, etc.), or generate device commands (e.g., to accomplish various memory management functions) for the device controller 214 or one or more other components of the memory device 210.

The memory manager can include a set of management tables configured to maintain various information associated with one or more component of the memory device 210 (e.g., various information associated with a memory array or one or more memory cells coupled to the memory controller 211). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 211. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables or a L2P mapping.

The memory manager can implement and use data structures to reduce memory device 210 latency in operations that involve searching L2P tables for valid pages, such as garbage collection. To this end, the memory manager is arranged to maintain a data structure (e.g., table region data structure, tracking data structure, etc.) for a physical block. The data structure includes indications of L2P mapping table regions, of the L2P table. In certain examples, the data structure is a bitmap (e.g., a binary array). In an example, the bitmap includes a bit for each region of multiple, mutually exclusive, regions that span the L2P table.

The NVM device 212 or the NVM 213 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physical-to-logical (P2L) table chunk, etc., and a super page can include a combination of multiple pages.

The term "super" can refer to a combination or multiples of a thing or things. For examples, a super block can include a combination of blocks. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

In operation, data is typically written to or read from the memory device 210 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512B) as well as a number of bytes (e.g., 32B, 54B, 224B, etc.) of auxiliary or metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be handled in an optimized manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

Figure 3:
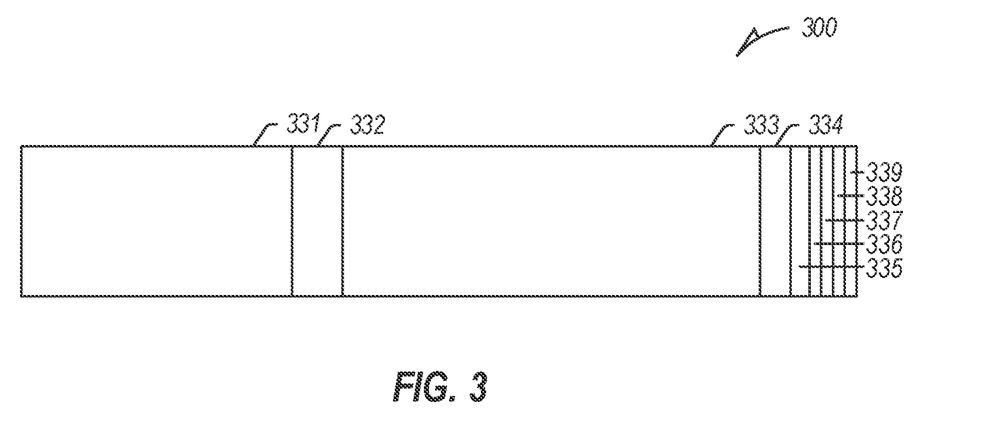
FIG. 3 illustrates a first Replay Protected Memory Block (RPMB) data frame.

FIG. 3 illustrates a first RPMB data frame 300. The first RPMB data frame 300 includes stuff bytes 331 (e.g., 196 bytes), key/mac (message authentication code) bytes 332 (e.g., 32 bytes), data 333 (e.g., 256 bytes), nonce bytes 334 (e.g., 16 bytes, randomly generated for each read command, etc.), write counter bytes 335 (e.g., 4 bytes), address bytes 336 (e.g., 2 bytes), block count bytes 337 (e.g., 2 bytes), result bytes 338 (e.g., 2 bytes), and req/resp message type bytes 339 (e.g., 2 bytes). In an example, each first RPMB data frame 300 can include a total of 512 bytes, with 256 bytes of data. Thus, first RPMB data frame communication requires 50% overhead between a host device and a memory device, with a repeating 256 bytes of overhead for each data frame.

Figure 4:
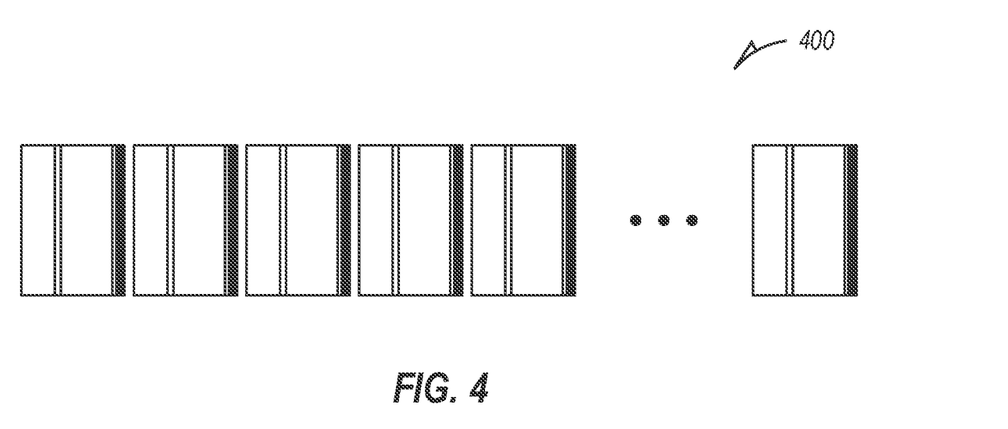
FIG. 4 illustrates a string of n first RPMB data frames.

FIG. 4 illustrates a string of n first RPMB data frames 400, including first, second, third, fourth, fifth, and nth first RPMB data frames, respectively. First RPMB data frames are restricted to 256 bytes of data with 256 bytes of overhead. In other examples, other numbers of data frames can be used, depending on the amount of protected data sent or received. In an example, each respective data frame must be adapted or verified by one or more of the host RPMB circuit or the memory device RPMB circuit, requiring a certain amount of processing power, time, and communication bandwidth, as first RPMB data frame read and write performance can be at least several times slower than read and write access to normal, unprotected portions of a memory device (e.g., a user partition, etc.).

Figure 5:
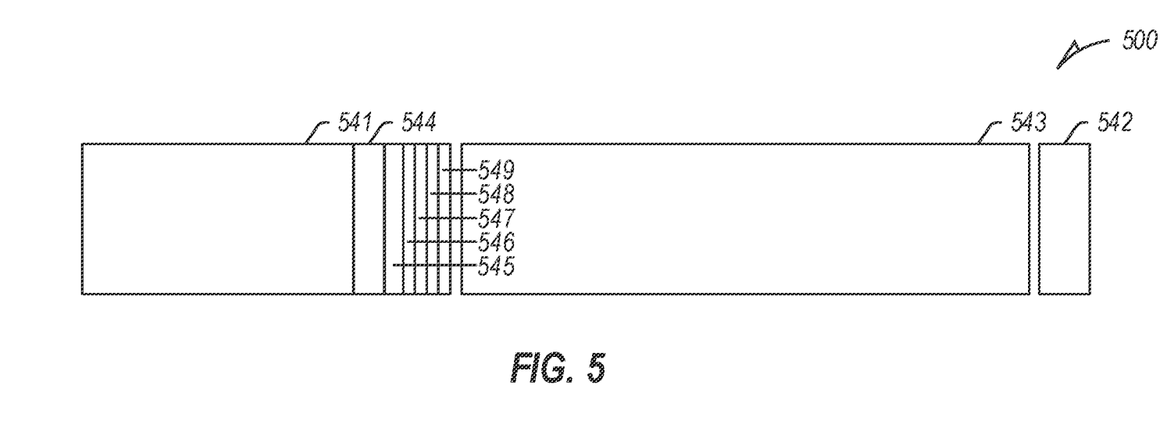
FIG. 5 illustrates a second RPMB data frame.

FIG. 5 illustrates a second RPMB data frame 500. In contrast to the first RPMB data frame (e.g., illustrated in FIG. 3), the second RPMB data frame 500 separates the overhead, or header (or meta) information prior to the data, from the data, and moves key/mac bytes to the end of the data frame, following the data. The second RPMB data frame header information includes stuff bytes 541 (e.g., 196 bytes), nonce bytes 544 (e.g., 16 bytes), write counter bytes 545 (e.g., 4 bytes), address bytes 546 (e.g., 2 bytes), block count bytes 547 (e.g., 2 bytes), result bytes 548 (e.g., 2 bytes), and req/resp message type bytes 549 (e.g., 2 bytes), for a total of 224 initial bytes of overhead. Following the header is data 543 (e.g., n×4 kB, where n is a number of 4 kB chunks of data, blocks, etc.) and key/mac bytes 542 (e.g., 32 bytes). In other examples, other sizes of data (e.g., in other sizes, chunks, blocks, etc.) can be transferred between the initial bytes (e.g., 541 and 544-549) and the closing key/mac bytes 542, reducing overhead by requiring only one set of initial/header/meta bytes and key/mac bytes per data transaction. The key/mac bytes can be moved to the end of the transaction to enable streaming (on-the-fly) MAC calculation.

The present inventors have recognized, among other things, further overhead/header reductions and improvements in RPMB operations and data transfers (e.g., reads, writes, etc.), including an improved RPMB data frame. In an example, stuff bytes can be removed from the RPMB data frame, and the order of bytes in the data frame header can be changed for more intuitive for use in the system (e.g., for use before all bytes are received, etc.). Desired write capacity continues to increase with each new generation of electronic or memory devices, to accommodate changing use conditions (e.g., memory devices storing sensitive credentials, user identity information, unique access information, tickets, etc.), or to adapt to increasing system reliability or lifetime. The write counter can be increased (e.g., from 4 bytes to 8 bytes or greater, etc.), such as to increase possible RPMB usage to accommodate increasing requests for sensitive data use by users of electronic devices. The size of the header, and total overhead, can be reduced from the 224 bytes illustrated in the second RPMB data frame 500 of FIG. 5, to just 32 bytes (or 64, with 32 bytes reserved for later usage), increasing efficiency, bandwidth, and optimizing processes.

Figure 6:
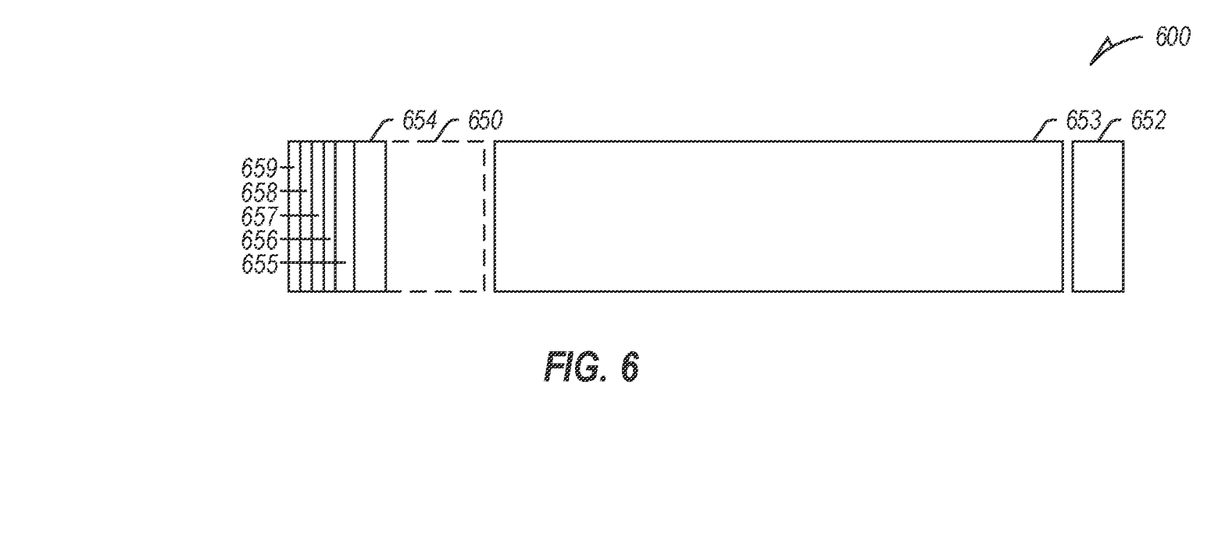
FIG. 6 illustrates a third RPMB data frame.

FIG. 6 illustrates a third RPMB data frame 600. The header of the third RPMB data frame 600 includes req/resp message type bytes 659 (e.g., 2 bytes), result bytes 658 (e.g., 2 bytes), block count bytes 657 (e.g., 2 bytes), address bytes 656 (e.g., 2 bytes), write counter bytes 655 (e.g., 8 bytes), and nonce bytes 654 (e.g., 16 bytes). In an example, initial bytes of overhead prior to data and key/mac bytes can be as few as 32 bytes (or 28, with a 4-byte write counter). In an example, reserved/optional bytes 650 (e.g., 32 bytes) can be held for future expansion, bringing the initial bytes of overhead to 64 bytes. For example, the size of the address bytes 656 can be increased (e.g., to 16 bytes, etc.) to enable encryption of the address.

The header, or initial overhead bytes, can be followed by data 653 (e.g., n×4 kB, where n is a number of 4 kB chunks of data, blocks, etc.) and key/mac bytes 652 (e.g., 32 bytes). In other examples, other sizes of data (e.g., in other sizes, chunks, blocks, etc.) can be transferred between the initial bytes (e.g., 654-659) and the closing key/mac bytes 652, further reducing overhead. In an example, the key/mac bytes 652 can signify the end of the RPMB data transmission.

The present inventors have further recognized that an RPMB command queue can be implemented, such as in a table or one or more other data structure, such as in the memory controller, control circuitry, the RPMB circuit, or one or more other component, further improving RPMB processes. First RPMB data frame processes are transaction based and require at least two security protocol in/out commands to complete a transaction. RPMB logical units (LU) associated with first RPMB data frame processes are limited to an effective queue depth less than 1. Each individual security protocol in/out (e.g., step) in a transaction must be complete before the next one can start. This has a significant impact on overall performance, driving first RPMB data frame performance significantly below read/write QD1 (queue depth 1, with one thread taking place on the drive at a time). UFS currently supports QD32 (queue depth 32, with 32 separate threads taking place).

Although only one RPMB operation can be performed per RPMB region at a time, multiple RPMB operations can be queued up to a limit of the device queue depth. Further, a memory device can include multiple RPMB regions, in certain examples, each having a separate queue. Each separate RPMB region can be treated as a separate RPMB area, in certain examples having unique keys, counters, data areas, etc. In an example, each memory device can include one or more memory dies, each memory die can include one or more memory arrays, each memory array can include one or more RPMB partitions, and each RPMB partition can include one or more RPMB regions. As each RPMB region can be unique, a memory device can perform parallel RPMB operations as long as each operation is targeted to a separate RPMB region. A normal LU could have 32× security protocol in/out steps in the queue. Although the transaction order must be preserved for RPMB to satisfy the counter, there may be some parallelism. In certain examples, the memory device can read data from read addresses associated with queued read commands (e.g., out of order) and store the data in volatile memory (e.g., SDRAM, etc.) on the memory device until the corresponding RPMB command is executed in order, thereby having the data immediately for transfer to the host device or one or more other device coupled to the memory device. In certain examples, RPMB transactions can be processed in order, while memory device operations (even those associated with RPMB transactions) can be processed in parallel.

In an example, such limitations can be addressed in several ways. For example, operations to the RPMB LU can be ordered (e.g., strict ordering for write operations), such that the existing flow is preserved on all RPMB operations to ensure the write counter is satisfied, and steps are processed in the correct order. When an error occurs, the device can return the appropriate RPMB result code (e.g., associated with the error). The security in/out status response can set check condition with a sense key set to unit attention, indicating that the device has stopped processing normal host commands. As pending write commands will have invalid write counters if the current write command fails, error recovery is simplified. All outstanding security in/out commands (e.g., reads/writes, etc.) in the queue can be aborted, and a request sense operation can be sent to clear the outstanding unit attention.

In other examples, other error options can be implemented. For example, a new error status can be defined, including, in certain examples, separate sense and error codes. In an example, upon error detection, the device can auto abort pending RPMB commands. In other examples, a new RPMB task abort mechanism can be created within the RPMB protocol.

In an example, instead of assuming operation failure, and confirming the previous command is complete, the commands can be assumed to have been completed successfully until an error is received. The system can assume the requests are not attacks, optimizing paths for success, and not for failure, until errors are detected. Moreover, operations can be ordered in such a way to take advantage of device and drive efficiency. Operations can be batched. The memory device can have the next command in queue as soon as data and confirmation are sent. The order can be maintained, but memory device pipelines can be taken into consideration to improve efficiency—for example, taking into account the location of data in random reads, etc.

For example, at different configuration speeds, third RPMB data frame performance, such as that illustrated in FIG. 6, can provide transfer time reductions shown in Table 1 (in contrast to first RPMB data frame performance, such as that illustrated in FIG. 3) and Table 2 (in contrast to the second RPMB data frame performance, such as that illustrated in FIG. 5), assuming the following host capabilities (PWM) and high-speed (HS) gear frequencies: PWM Gear 1: 290 kB/s; HS Gear 1×1 Lane: 130 MB/s; and HS Gear 4×2 Lanes: 2070 MB/s. Various reference clock frequencies are possible without changing the HS Gear frequency.

TABLE 1

| Third v. First RPMB Data Frame Performance | PWM Gear-1 1 Lane (usec) | HS Gear 1 1 Lane (usec) | HS Gear 4 2 Lanes (usec) | Header Transfer Time Reduction | Frame Transfer Time Reduction 224 B vs 64 B | Frame Transfer Time Reduction 224 B vs 32 B |
|---|---|---|---|---|---|---|
| Header 224 B | 754.31 | 1.64 | 0.103 | — | — | — |
| Header 64 B | 215.52 | 0.47 | 0.029 | 71% | — | — |
| Header 32 B | 107.76 | 0.23 | 0.018 | 86% | — | — |
| Frame 4K | 13,793 | 30.05 | 1.89 | — | 38% | 43% |
| Frame 8K | 27,586 | 60.10 | 3.77 | — | 38% | 43% |
| Frame 12K | 41,379 | 90.14 | 5.66 | — | 38% | 43% |
| Frame 16K | 55,172 | 120.19 | 7.55 | — | 38% | 43% |

For the first RPMB data frame, there is a header for every 256B of user data. A 4 kB data transfer will require 16× headers. The header to data ratio is constant, meaning an 8 k transfer will have 32× headers. In contrast, the third RPMB data frame requires a single header per transfer with variable frame sizes, providing substantial improvement to both header and data frame transfer time and overhead.

TABLE 2

| Third v. Second RPMB Data Frame Performance | PWM Gear-1 1 Lane (usec) | HS Gear 1 1 Lane (usec) | HS Gear 4 2 Lanes (usec) | Header Transfer Time Reduction | Frame Transfer Time Reduction 224 B vs 64 B | Frame Transfer Time Reduction 224 B vs 32 B |
|---|---|---|---|---|---|---|
| Header 224 B | 754.31 | 1.64 | 0.103 | — | — | — |
| Header 64 B | 215.52 | 0.47 | 0.029 | 71% | — | — |

TABLE 2-continued

| Third v. Second RPMB Data Frame Performance | PWM Gear-1 1 Lane (usec) | HS Gear 1 1 Lane (usec) | HS Gear 4 2 Lanes (usec) | Header Transfer Time Reduction | Frame Transfer Time Reduction 224 B vs 64 B | Frame Transfer Time Reduction 224 B vs 32 B |
|---|---|---|---|---|---|---|
| Header 32 B | 107.76 | 0.23 | 0.018 | 86% | — | — |
| Frame 4K | 13,793 | 30.05 | 1.89 | — | 4% | 5% |
| Frame 8K | 27,586 | 60.10 | 3.77 | — | 2% | 2% |
| Frame 12K | 41,379 | 90.14 | 5.66 | — | 1% | 2% |
| Frame 16K | 55,172 | 120.19 | 7.55 | — | 1% | 1% |

For the second RPMB data frame, there is one header per transfer, similar to the third RPMB data frame. However, the reduction in header size and configuration are still beneficial.

The present inventors have further recognized a modified first RPMB data frame (e.g., a vendor-specific data frame, etc.), including req/resp message type bytes (e.g., 2 bytes), result bytes (e.g., 2 bytes), block count bytes (e.g., 2 bytes), address bytes (e.g., 2 bytes), write counter bytes (e.g., 8 bytes), nonce bytes (e.g., 16 bytes), key/mac (message authentication code) bytes (e.g., 32 bytes), and data (e.g., 256 bytes). The modified first RPMB data frame can require 20% overhead for communication between a host device and a memory device, with a repeating 64 bytes of overhead.

Figure 7:
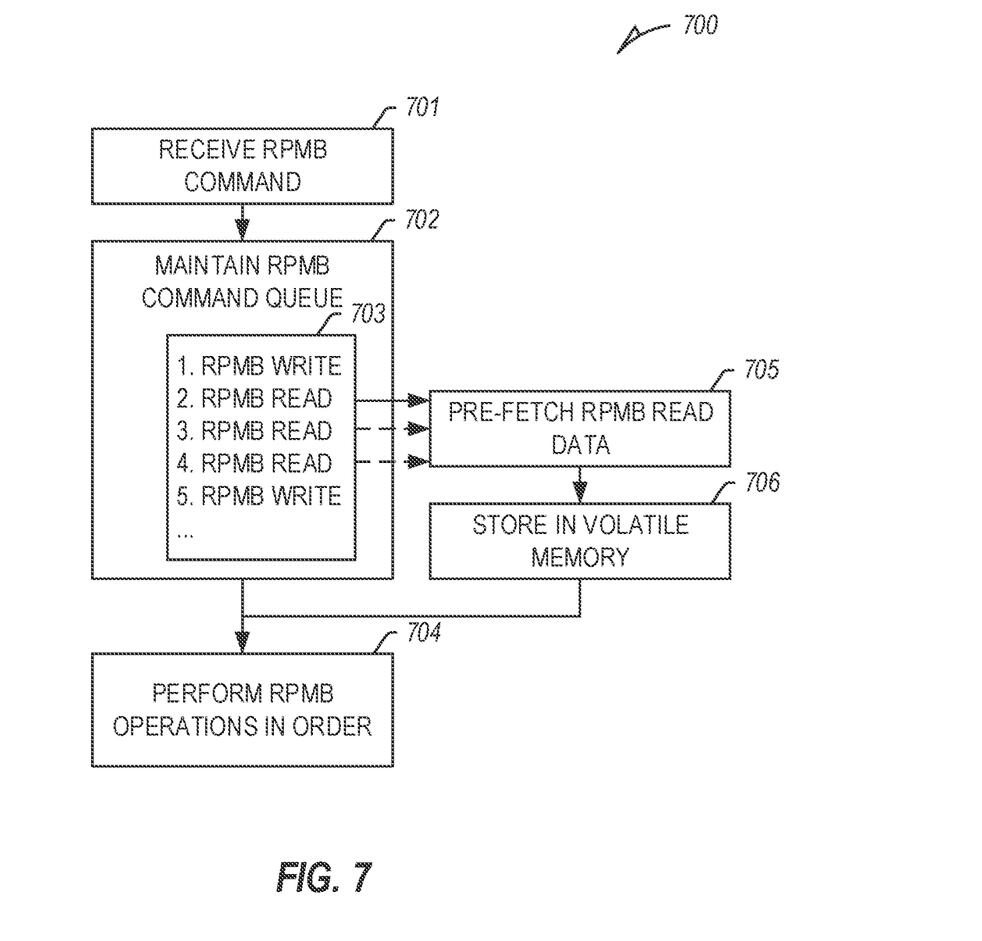
FIG. 7 illustrates an example method of maintaining an RPMB command queue.

FIG. 7 illustrates an example method 700 of implementing an RPMB command queue, such as using a table or data structure of the host or the memory device. In an example, the RPMB command queue can be implemented using a control circuitry, an RPMB circuit, etc. In an example, the control circuitry can include the RPMB circuit.

At 701, an RPMB command can be received, such as at a memory device from a host device. The RPMB command can include an RPMB write command, an RPMB read command, or one or more other RPMB commands, such as according to the data structures illustrated in FIGS. 3-6.

At 702, an RPMB command queue can be maintained using the received RPMB commands, such as by the control circuitry. In an example, the commands can be queued in the order they are received. In certain examples, the write commands can be queued in the order they are received, and the read commands can be performed out of order, so long as the write count associated with the RPMB write commands are maintained between the host device and the memory device. An example queue including a first RPMB write command, three RPMB read commands, and a second RPMB write command, having a specific order, is illustrated at 703. Such command queue can be maintained using a data structure in the memory device.

At 704, the RPMB operations can be performed in order. However, certain parallel operations may be performed to speed the RPMB process. In an example, at 705, RPMB read data can be pre-fetched out of order and stored in volatile memory of the memory device at 706. When the RPMB read operation is ready to be performed at 704, the information can be retrieved from volatile memory, instead of being read from the RPMB portion of the non-volatile memory.

In certain examples, a memory device can include multiple RPMB partitions or areas, and separate RPMB queues can be maintained for each area.

Figure 8:
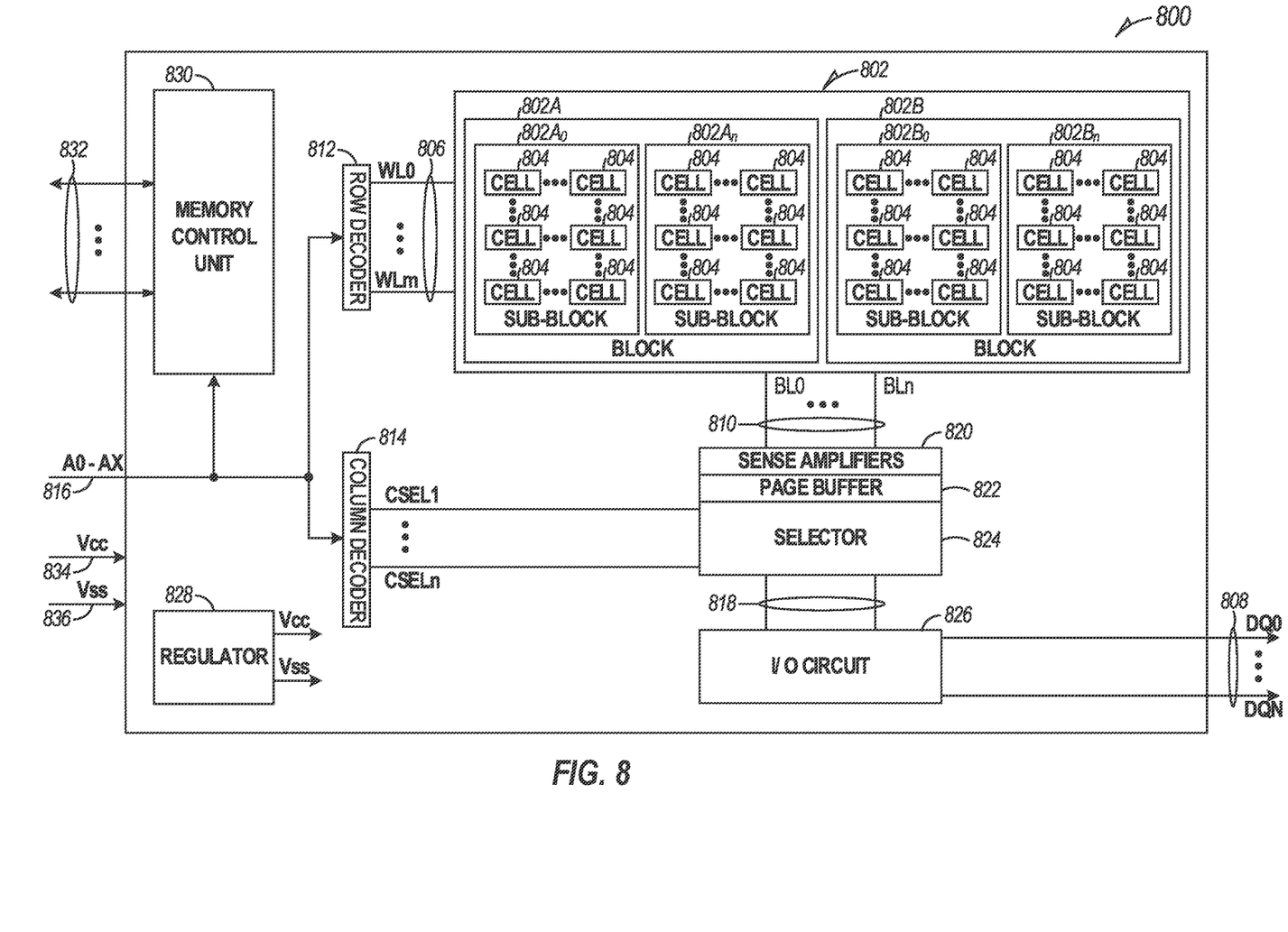
FIG. 8 illustrates an example block diagram of a memory device.

FIG. 8 illustrates an example block diagram of a memory device 800 including a memory array 802 having a plurality of memory cells 804, and one or more circuits or components to provide communication with, or perform one or more memory operations on, the memory array 802. Although shown with a single memory array 802, in other examples, one or more additional memory arrays, dies, or LUNs can be included herein. In certain examples, in a storage system having a number of dies or LUNs, the memory device 800 can represent a block diagram of circuits and components for each die or LUN. The memory device 800 can include a row decoder 812, a column decoder 814, sense amplifiers 820, a page buffer 822, a selector 824, an input/output (I/O) circuit 826, and a memory control unit 830.

The memory cells 804 of the memory array 802 can be arranged in blocks, such as first and second blocks 802A, 802B. Each block can include sub-blocks. For example, the first block 802A can include first and second sub-blocks 802A$_0$, 802A$_n$, and the second block 802B can include first and second sub-blocks 802B$_0$, 802B$_n$. Each sub-block can include a number of physical pages, each page including a number of memory cells 804. Although illustrated herein as having two blocks, each block having two sub-blocks, and each sub-block having a number of memory cells 804, in other examples, the memory array 802 can include more or fewer blocks, sub-blocks, memory cells, etc. In other examples, the memory cells 804 can be arranged in a number of rows, columns, pages, sub-blocks, blocks, etc., and accessed using, for example, access lines 806, first data lines 810, or one or more select gates, source lines, etc.

The memory control unit 830 can control memory operations of the memory device 800 according to one or more signals or instructions received on control lines 832, including, for example, one or more clock signals or control signals that indicate a desired operation (e.g., write, read, erase, etc.), or address signals (A0-AX) received on one or more address lines 816. One or more devices external to the memory device 800 can control the values of the control signals on the control lines 832, or the address signals on the address line 816. Examples of devices external to the memory device 800 can include, but are not limited to, a host, a memory controller, a processor, or one or more circuits or components not illustrated in FIG. 8.

The memory device 800 can use access lines 806 and first data lines 810 to transfer data to (e.g., write or erase) or from (e.g., read) one or more of the memory cells 804. The row decoder 812 and the column decoder 814 can receive and decode the address signals (A0-AX) from the address line 816, can determine which of the memory cells 804 are to be accessed, and can provide signals to one or more of the access lines 806 (e.g., one or more of a plurality of word lines (WL0-WLm)) or the first data lines 810 (e.g., one or more of a plurality of bit lines (BL0-BLn)), such as described above.

The memory device 800 can include sense circuitry, such as the sense amplifiers 820, configured to determine the values of data on (e.g., read), or to determine the values of data to be written to, the memory cells 804 using the first data lines 810. For example, in a selected string of memory cells 804, one or more of the sense amplifiers 820 can read a logic level in the selected memory cell 804 in response to a read current flowing in the memory array 802 through the selected string to the data lines 810.

One or more devices external to the memory device 800 can communicate with the memory device 800 using the I/O lines (DQ0-DQN) 808, address lines 816 (A0-AX), or control lines 832. The input/output (I/O) circuit 826 can transfer values of data in or out of the memory device 800, such as in or out of the page buffer 822 or the memory array 802, using the I/O lines 808, according to, for example, the control lines 832 and address lines 816. The page buffer 822 can store data received from the one or more devices external to the memory device 800 before the data is programmed into relevant portions of the memory array 802, or can store data read from the memory array 802 before the data is transmitted to the one or more devices external to the memory device 800.

The column decoder 814 can receive and decode address signals (A0-AX) into one or more column select signals (CSEL1-CSELn). The selector 824 (e.g., a select circuit) can receive the column select signals (CSEL1-CSELn) and select data in the page buffer 822 representing values of data to be read from or to be programmed into memory cells 804. Selected data can be transferred between the page buffer 822 and the I/O circuit 826 using second data lines 818.

The memory control unit 830 can receive positive and negative supply signals, such as a supply voltage (Vcc) 834 and a negative supply (Vss) 836 (e.g., a ground potential), from an external source or supply (e.g., an internal or external battery, an AC-to-DC converter, etc.). In certain examples, the memory control unit 830 can include a regulator 828 to internally provide positive or negative supply signals.

Figure 9:
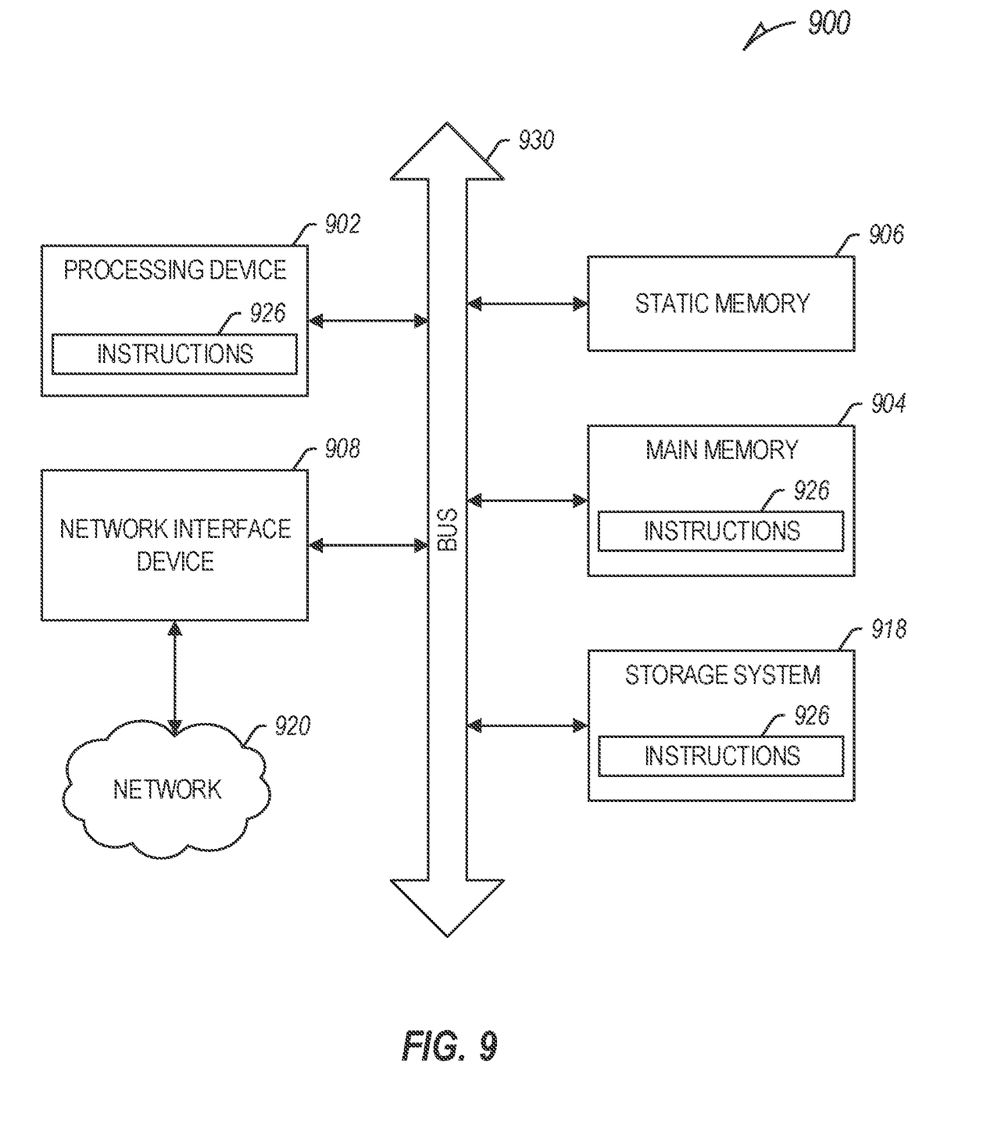
FIG. 9 illustrates a block diagram of an example machine upon which any one or more of the techniques (e.g., methodologies) discussed herein may perform.

FIG. 9 illustrates a block diagram of an example machine (e.g., a host system) 900 upon which any one or more of the techniques (e.g., methodologies) discussed herein may perform (e.g., such as those described in FIG. 1, etc.). In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible overtime and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 900 may include a processing device 902 (e.g., a hardware processor, a central processing unit (CPU), a graphics processing unit (GPU), a hardware processor core, or any combination thereof, etc.), a main memory 904 (e.g., read-only memory (ROM), dynamic random-access memory (DRAM) such as synchronous DRAM (SDRAM) or Rambus DRAM (RDRAM), etc.), a static memory 906 (e.g., static random-access memory (SRAM), etc.), and a storage system 918, some or all of which may communicate with each other via a communication interface (e.g., a bus) 930.

The processing device 902 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 902 can also be one or more special-purpose processing devices such as an application specific integrated circuit (ASIC), a field programmable gate array (FPGA), a digital signal processor (DSP), network processor, or the like. The processing device 902 can be configured to execute instructions 926 for performing the operations and steps discussed herein. The computer system 900 can further include a network interface device 908 to communicate over a network 920.

The storage system 918 can include a machine-readable storage medium (also known as a computer-readable medium) on which is stored one or more sets of instructions 926 or software embodying any one or more of the methodologies or functions described herein. The instructions 926 can also reside, completely or at least partially, within the main memory 904 or within the processing device 902 during execution thereof by the computer system 900, the main memory 904 and the processing device 902 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 900 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 900 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 926 (e.g., software, programs, an operating system (OS), etc.) or other data are stored on the storage system 918 can be accessed by the main memory 904 for use by the processing device 902. The main memory 904 (e.g., DRAM) is typically fast, but volatile, and thus a different type of storage than the storage system 918 (e.g., an SSD), which is suitable for long-term storage, including while in an "off" condition. The instructions 926 or data in use by a user or the machine 900 are typically loaded in the main memory 904 for use by the processing device 902. When the main memory 904 is full, virtual space from the storage system 918 can be allocated to supplement the main memory 904; however, because the storage system 918 device is typically slower than the main memory 904, and write speeds are typically at least twice as slow as read speeds, use of virtual memory can greatly reduce user experience due to storage system latency (in contrast to the main memory 904, e.g., DRAM). Further, use of the storage system 918 for virtual memory can greatly reduce the usable lifespan of the storage system 918.

The instructions 924 may further be transmitted or received over a network 920 using a transmission medium via the network interface device 908 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 908 may include one or more physical jacks (e.g., Ethernet, coaxial, or phone jacks) or one or more antennas to connect to the network 920. In an example, the network interface device 908 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, control circuitry, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Example 1 is a system comprising: a memory device comprising a memory array and a control circuitry, wherein the control circuitry is configured to receive Replay Protected Memory Block (RPMB) commands from a host device, to maintain an RPMB command queue using the received RPMB commands, and to perform RPMB commands in order according to the RPMB command queue, wherein the memory device is configured to pre-fetch read data from a read address associated with a queued RPMB read command out of order and store the pre-fetched read data in volatile memory of the memory device to be provided to the host device in order according to the RPMB command queue.

In Example 2, the subject matter of Example 1 optionally includes wherein the memory device is configured to perform RPMB write commands in the RPMB command queue in order according to the RPMB command queue and the counter, to perform the RPMB read commands in order according to the RPMB command queue using the pre-fetched read data.

In Example 3, the subject matter of any one or more of Examples 1-2 optionally include wherein the memory device comprises multiple memory die, at least two of the multiple memory die comprising respective RPMB areas, and wherein the memory device is configured to maintain separate RPMB command queues for the respective RPMB areas.

In Example 4, the subject matter of any one or more of Examples 1-3 optionally include wherein the memory device comprises multiple memory die, at least two of the multiple memory die comprising respective RPMB areas, and wherein each of the multiple memory die comprises control logic, wherein the control logic is configured to maintain RPMB command queues for each respective RPMB area.

In Example 5, the subject matter of any one or more of Examples 1-4 optionally include wherein the memory device comprises multiple RPMB areas and is configured to maintain separate RPMB command queues for each of the multiple RPMB areas, each of the multiple RPMB areas having a unique key, counter, and data area.

In Example 6, the subject matter of any one or more of Examples 1-5 optionally include wherein the memory device comprises an RPMB area and an RPMB circuit, wherein the RPMB circuit is configured to control access to the RPMB area and to maintain the RPMB command queue for the RPMB area.

In Example 7, the subject matter of Example 6 optionally includes a host device configured to provide the RPMB command to the memory device, the RPMB command comprising an RPMB data frame, the RPMB data frame comprising 8 write counter bytes, wherein the RPMB circuit is configured to implement a counter and to verify the order of an RPMB write command with the received counter bytes and the counter.

In Example 8, the subject matter of Example 7 optionally includes wherein the RPMB data frame comprises: header bytes, consisting of 32-64 bytes of data; data bytes following the header bytes; and message authentication code (MAC) bytes following the data bytes.

In Example 9, the subject matter of Example 8 optionally includes wherein the header bytes comprise, in order: 2 req/resp message type bytes; 2 result bytes; 2 block count bytes; 2 address bytes; 8 write counter bytes; and 16 nonce bytes.

In Example 10, the subject matter of any one or more of Examples 8-9 optionally include wherein the data bytes comprise a number (n) chunks of data, the n chunks of data consisting of all of the data bytes for a single read or write transfer, and the header bytes and the MAC bytes consisting all of the header bytes and MAC bytes for the single read or write transfer.

Example 11 is a method comprising: receiving, at a memory device, multiple Replay Protected Memory Block (RPMB) commands from a host device; maintaining, using control circuitry of the memory device, an RPMB command queue using the received RPMB commands in the order received from the host device; pre-fetching, using the control circuitry, read data from a read address associated with an RPMB command in the RPMB command queue out of order and storing the pre-fetched read data in volatile memory of the memory device; and performing, using the control circuitry, RPMB commands according to the RPMB command queue.

In Example 12, the subject matter of Example 11 optionally includes wherein performing RPMB commands comprises: performing RPMB write commands in the RPMB command queue in order according to the RPMB command queue and the counter; and performing the RPMB read commands in order according to the RPMB command queue using the pre-fetched read data.

In Example 13, the subject matter of any one or more of Examples 11-12 optionally include wherein maintaining the RPMB command queue comprises maintaining separate RPMB command queues for respective RPMB areas of the memory device.

In Example 14, the subject matter of any one or more of Examples 11-13 optionally include wherein the memory device comprises multiple memory die, each comprising respective control logic and RPMB areas, wherein maintaining the separate RPMB command queues comprises maintaining respective RPMB command queues for each RPMB area using the control logic of the memory die.

In Example 15, the subject matter of any one or more of Examples 11-14 optionally include wherein the memory device comprises multiple RPMB areas and is configured to maintain separate RPMB command queues for each of the multiple RPMB areas, each of the multiple RPMB areas having a unique key, counter, and data area.

In Example 16, the subject matter of any one or more of Examples 11-15 optionally include wherein the memory device comprises an RPMB area and an RPMB circuit, wherein the RPMB circuit is configured to control access to the RPMB area and to maintain the RPMB command queue for the RPMB area.

In Example 17, the subject matter of Example 16 optionally includes providing the RPMB command to the memory device using a host device, the RPMB command comprising an RPMB data frame, the RPMB data frame comprising 8 write counter bytes; and implementing, using the RPMB circuit, a counter and verifying the order of a received RPMB write command with the received counter bytes of the counter.

In Example 18, the subject matter of Example 17 optionally includes wherein providing the RPMB command comprises providing an RPMB data frame comprising providing: header bytes, consisting of 32-64 bytes of data; data bytes following the header bytes; and message authentication code (MAC) bytes following the data bytes.

In Example 19, the subject matter of Example 18 optionally includes wherein providing the RPMB header bytes comprises providing, in order: 2 req/resp message type bytes; 2 result bytes; 2 block count bytes; 2 address bytes; 8 write counter bytes; and 16 nonce bytes.

In Example 20, the subject matter of any one or more of Examples 18-19 optionally include wherein providing the data bytes comprises providing a number (n) chunks of data, the n chunks of data consisting of all of the data bytes for a single read or write transfer, and wherein providing the header bytes and the MAC bytes consists of providing all of the header bytes and MAC bytes for the single read or write transfer.

In Example 21, subject matter (e.g., a system or apparatus) may optionally combine any portion or combination of any portion of any one or more of Examples 1-20 to comprise "means for" performing any portion of any one or more of the functions or methods of Examples 1-20, or at least one "non-transitory machine-readable medium" including instructions that, when performed by a machine, cause the machine to perform any portion of any one or more of the functions or methods of Examples 1-20.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system comprising:
    a memory device comprising a memory array and control circuitry, wherein the control circuitry is configured to receive Replay Protected Memory Block (RPMB) commands from a host device, the received RPMB commands comprising RPBM read and write commands to be performed on non-volatile memory of the memory device, to maintain an RPMB command queue using the received RPMB commands, and to perform the received RPMB commands in order according to the RPMB command queue,
    wherein the memory device is configured to pre-fetch read data from a read address associated with a queued RPMB read command out of order with respect to one or more RPMB write commands, in parallel to execution of the one or more RPMB write commands, and store the pre-fetched read data associated with the queued RPMB read command in volatile memory of the memory device to be provided to the host device in order according to the RPMB command queue, while the control circuitry is performing the received RPMB commands in order according to the RPMB command queue.

2. The system of claim 1, wherein the memory device is configured to perform RPMB write commands in the RPMB command queue in order according to the RPMB command queue and a counter, and to perform the RPMB read commands in order according to the RPMB command queue using the pre-fetched read data.

3. The system of claim 1, wherein the memory device comprises multiple memory die, each comprising respective RPMB areas, and
    wherein the memory device is configured to maintain separate RPMB command queues for the respective RPMB areas.

4. The system of claim 1, wherein the memory device comprises multiple memory die, each comprising respective RPMB areas, and
    wherein each of the multiple memory die comprises control logic, wherein the control logic is configured to maintain RPMB command queues for each respective RPMB area.

5. The system of claim 1, wherein the memory device comprises multiple RPMB areas and is configured to maintain separate RPMB command queues for each of the multiple RPMB areas, each of the multiple RPMB areas having a unique key, counter, and data area.

6. The system of claim 1, wherein the memory device comprises an RPMB area and an RPMB circuit, and
    wherein the RPMB circuit is configured to control access to the RPMB area and to maintain the RPMB command queue for the RPMB area.

7. The system of claim 6, comprising:
    a host device configured to provide the RPMB command to the memory device, the RPMB command comprising an RPMB data frame, the RPMB data frame comprising 8 write counter bytes,
    wherein the RPMB circuit is configured to implement a counter and to verify the order of an RPMB write command with the received counter bytes and the counter.

8. The system of claim 7, wherein the RPMB data frame comprises:
    header bytes, consisting of 32-64 bytes of data;
    data bytes following the header bytes; and
    message authentication code (MAC) bytes following the data bytes.

9. The system of claim 8, wherein the header bytes comprise, in order:
    2 req/resp message type bytes;
    2 result bytes;
    2 block count bytes;
    2 address bytes;
    8 write counter bytes; and
    16 nonce bytes.

10. The system of claim 8, wherein the data bytes comprise a number (n) chunks of data, the n chunks of data consisting of all of the data bytes for a single read or write transfer, and the header bytes and the MAC bytes consisting all of the header bytes and MAC bytes for the single read or write transfer.

11. A method comprising:
    receiving, at a memory device, multiple Replay Protected Memory Block (RPMB) commands from a host device, the received RPMB commands comprising RPBM read and write commands to be performed on non-volatile memory of the memory device;
    maintaining, using control circuitry of the memory device, an RPMB command queue using the received RPMB commands in the order received from the host device; and
    performing, using the control circuitry, the received RPMB commands in order according to the RPMB command queue, comprising:
        pre-fetching, using the control circuitry, read data from a read address associated with an RPMB command in the RPMB command queue out of order with respect to one or more RPMB write commands, in parallel to execution of the one or more RPMB write commands, and storing the pre-fetched read data associated with the queued RPMB read command in volatile memory of the memory device to be provided to the host device in order according to the RPMB command queue while still performing the received RPMB commands in order according to the RPMB command queue.

12. The method of claim 11, wherein performing RPMB commands comprises:
    performing RPMB write commands in the RPMB command queue in order according to the RPMB command queue and a counter; and
    performing the RPMB read commands in order according to the RPMB command queue using the pre-fetched read data.

13. The method of claim 11, wherein maintaining the RPMB command queue comprises maintaining separate RPMB command queues for respective RPMB areas of the memory device.

14. The method of claim 11, wherein the memory device comprises multiple memory die, each comprising respective control logic and RPMB areas, and
    wherein maintaining the separate RPMB command queues comprises maintaining respective RPMB command queues for each RPMB area using the control logic of the memory die.

15. The method of claim 11, wherein the memory device comprises multiple RPMB areas and is configured to maintain separate RPMB command queues for each of the multiple RPMB areas, each of the multiple RPMB areas having a unique key, counter, and data area.

16. The method of claim 11, wherein the memory device comprises an RPMB area and an RPMB circuit, and
    wherein the RPMB circuit is configured to control access to the RPMB area and to maintain the RPMB command queue for the RPMB area,
    wherein the RPMB commands comprise first and second RPMB read commands, wherein the first RPMB read command is distinct from the second RPMB read command, and
    wherein performing the RPMB commands comprises providing pre-fetched read data associated with the first and second RPMB read commands to the host in order according to the RPMB command queue.

17. The method of claim 16, comprising:
    providing the RPMB command to the memory device using a host device, the RPMB command comprising an RPMB data frame, the RPMB data frame comprising 8 write counter bytes; and
    implementing, using the RPMB circuit, a counter and verifying the order of a received RPMB write command with the received counter bytes of the counter.

18. The method of claim 17, wherein providing the RPMB command comprises providing an RPMB data frame comprising providing:
    header bytes, consisting of 32-64 bytes of data;
    data bytes following the header bytes; and
    message authentication code (MAC) bytes following the data bytes.

19. The method of claim 18, wherein providing the RPMB header bytes comprises providing, in order:
    2 req/resp message type bytes;
    2 result bytes;
    2 block count bytes;
    2 address bytes;
    8 write counter bytes; and
    16 nonce bytes.

20. The method of claim 18, wherein providing the data bytes comprises providing a number (n) chunks of data, the n chunks of data consisting of all of the data bytes for a single read or write transfer, and
    wherein providing the header bytes and the MAC bytes consists of providing all of the header bytes and MAC bytes for the single read or write transfer.

21. At least one non-transitory device-readable storage medium comprising instructions that, when executed by control circuitry of a memory device, cause the control circuitry to perform operations comprising:
    receiving multiple Replay Protected Memory Block (RPMB) commands from a host device, the received RPMB commands comprising RPBM read and write commands to be performed on non-volatile memory of the memory device;
    maintaining an RPMB command queue using the received RPMB commands in the order received from the host device;
    performing the received RPMB commands in order according to the RPMB command queue, comprising:
        pre-fetching read data from a read address associated with an RPMB command in the RPMB command queue out of order with respect to one or more RPMB write commands, in parallel to execution of the one or more RPMB write commands, and storing the pre-fetched read data associated with the queued RPMB read command in volatile memory of the memory device to be provided to the host device in order according to the RPMB command queue while still performing the received RPMB commands in order according to the RPMB command queue.

22. The storage medium of claim 21, wherein performing RPMB commands comprises:
    performing RPMB write commands in the RPMB command queue in order according to the RPMB command queue and a counter; and
    performing the RPMB read commands in order according to the RPMB command queue using the pre-fetched read data.

23. The storage medium of claim 21, wherein maintaining the RPMB command queue comprises maintaining separate RPMB command queues for respective RPMB areas of the memory device.

24. The storage medium of claim 21, wherein receiving an RPMB command comprises receiving an RPMB data frame comprising:
    header bytes, consisting of 32-64 bytes of data;
    data bytes following the header bytes; and
    message authentication code (MAC) bytes following the data bytes.

25. The storage medium of claim 24, wherein receiving the RPMB header bytes comprises receiving, in order:
    2 req/resp message type bytes;
    2 result bytes;
    2 block count bytes;
    2 address bytes;
    8 write counter bytes; and
    16 nonce bytes.

26. The storage medium of claim 24, wherein receiving the data bytes comprises receiving a number (n) chunks of data, the n chunks of data consisting of all of the data bytes for a single read or write transfer, and
    wherein receiving the header bytes and the MAC bytes consists of receiving all of the header bytes and MAC bytes for the single read or write transfer.

* * * * *